United States Patent [19]

Arnold

[11] 3,956,133

[45] May 11, 1976

[54] CLEAN-OUT COUPLING FOR DOWNSPOUTS

[76] Inventor: George J. Arnold, 6665 Floyd, Detroit, Mich. 48210

[22] Filed: Nov. 11, 1974

[21] Appl. No.: 522,612

[52] U.S. Cl.............................. 210/232; 210/407; 210/447
[51] Int. Cl.²......................................... B01D 35/00
[58] Field of Search.... 210/232, 238, 312, 446–448, 210/407

[56] References Cited
UNITED STATES PATENTS

| | | | |
|---|---|---|---|
| 289,473 | 12/1883 | Van Tassel | 210/447 |
| 381,990 | 6/1888 | Driller | 210/446 X |
| 1,471,215 | 10/1923 | Sigman | 210/446 |

Primary Examiner—Charles N. Hart
Assistant Examiner—Richard W. Burks
Attorney, Agent, or Firm—Willis Bugbee

[57] ABSTRACT

A vertical upper inlet duct adapted to be connected to an upper section of a downspout or conductor leads downward through the upper wall of an open-ended horizontal box-shaped housing with a tapered bottom wall converging to a downwardly-tapered vertical outlet duct. The latter connects with a lower section of the downspout or conductor. A screen or grating is inserted in the box-shaped housing over the outlet therefrom, which may be cleaned of leaves or other waterborne trash collecting thereon by the user inserting his hand through either of the open ends of the housing. The screen itself is also similarly removable for cleaning.

2 Claims, 3 Drawing Figures

U.S. Patent   May 11, 1976   3,956,133
FIG. 1
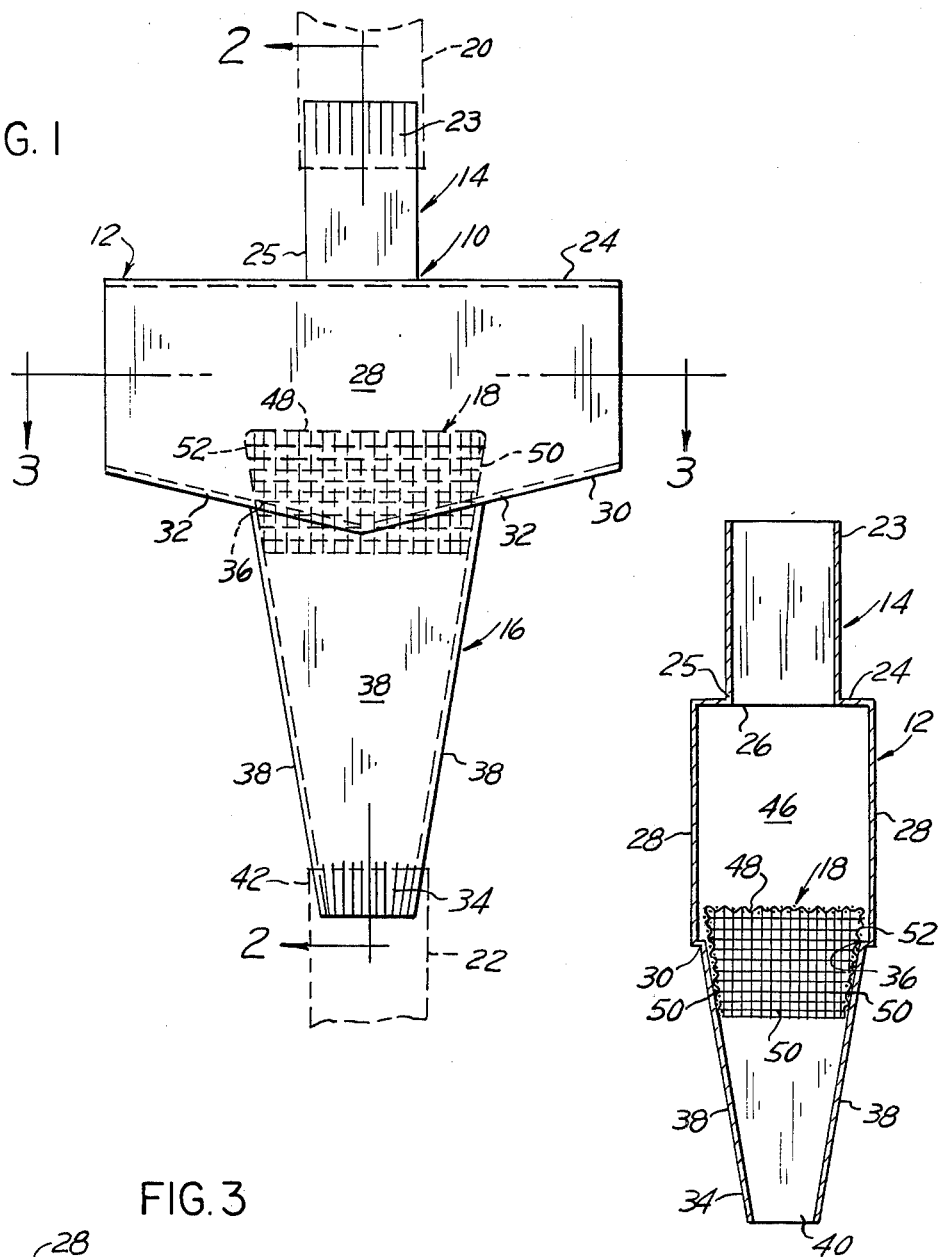
FIG. 2
FIG. 3
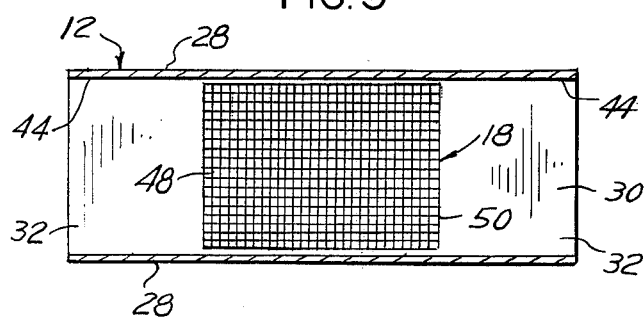

CLEAN-OUT COUPLING FOR DOWNSPOUTS

SUMMARY OF THE INVENTION

Hitherto, the outlets of the eaves troughs or gutters of buildings having adjacent trees have been clogged with leaves or other trash falling therefrom, even though screens have been provided in such outlets for catching such trash. The removal of such trash and the unclogging of such screens has required the use of persons to stand on the top rungs of tall ladders which in turn has involved hazardous operations. The present cleanout coupling, inserted in a gap in the downspout within the reach of a person standing on the ground, eliminates the hazards of such cleaning operations.

In the drawings,

FIG. 1 is a front elevation of a cleanout coupling, according to one form of the invention;

FIG. 2 is a central vertical section taken along the line 2—2 in FIG. 1; and

FIG. 3 is a horizontal section taken along the line 3—3 in FIG. 1.

Referring to the drawing in detail, FIG. 1 shows a downspout or conductor cleanout coupling, generally designated 10, having an open-ended horizontal box-shaped trash-collection housing, generally designated 12, with which an upper tubular inlet duct 14 and a lower tapered tubular outlet duct 16 communicate, the entrance to the outlet duct 16 within the housing 12 being provided with a frusto-pyramidal screen, generally designated 18. The inlet duct 14 and outlet duct 16 are either of round or rectangular cross-section, depending upon the shape of the upper downspout section 20 or lower downspout section 22 over which or into which they are adapted to fit. The upper end portion 23 of the upper duct 14 is corrugated or fluted, whereas its lower end portion 25 is connected to the top wall 24 of the box-shaped housing 12 at a central inlet opening 26 (FIG. 2).

The box-shaped housing 12 is provided with spaced parallel side walls 28 (FIGS. 2 and 3) and a tapered bottom wall 30 consisting of oppositely-inclined wall portions 32 sloping downward to a central outlet opening 36. The corrugated or fluted lower end portion 34 of the tapered vertical tubular outlet duct 16 is connected to the central opening 36 and is of hollow frusto-pyramidal shape with downwardly-tapering side walls 38 converging toward the rectangular discharge opening 40 at the bottom thereof (FIG. 2). The tapered corrugated or fluted lower end portion 34 of the outlet duct 16 fits into various sizes of the upper end portions 42 of the lower downspout or conductor section 22. The open-ended horizontal box-shaped housing 12, as its name suggests, has opposite end access openings 44 to the chamber 46 therein (FIG. 3). The frusto-pyramical screen 18 has a reticulated upper wall 48 and downwardly-tapering reticulated side walls 50 which are of sufficiently larger cross-section to cause the upper portion of the screen 18 to project above the outlet opening 36 in an upstanding reticulated portion 52 (FIG. 2).

In the use of the invention, let it be assumed that the end portions 25 and 42 of the upper and lower downspout sections 20 and 22 have been separated a sufficient distance to provide a gap adapted to receive the upper and lower inlet and outlet ducts 14 and 16 in overlapping relationship with the lower end portion 25 of the upper downspout section 20 telescoping over the upper end portion 23 of the inlet duct 14 and with the lower end portion 34 of the tapered outlet duct 16 extending into the upper end portion 42 of the lower downspout section 22. Let it also be assumed that the frusto-pyramidal screen 18 has been inverted and inserted in the outlet opening 36 with its upper portion 50 extending above the bottom wall 30.

In operation, especially in the Fall of the year, leaves and other trash collect in the gutters or eaves troughs (not shown) from the downspout or conductor entrances of which the conventional screens have been removed or omitted. Such trash is carried downward by rain water through the upper downspout section 20 and through the upper tubular inlet duct 14 into the chamber 46 within the horizontal box-shaped trash collection housing 12 whence it falls on the top wall 48 of the screen 18 and collects around the upwardly-projecting portions 52 of the side walls 50 thereof on top of the tapered portions 32 of the bottom wall 30. The rain water, thus freed from its trash, passes downward through the screen 18 and outlet duct 16 into the lower downspout section 22 and thence to the storm sewer or other means of disposal. When such trash collects to an objectionable extent, or clogs the screen 18, the user merely stands beside the cleanout coupling 10 and inserts his hand through one of the two access openings 44 (FIG. 3) and removes the trash. The screen 18 may, if necessary, be removed by pulling it upward out of the outlet opening 36 and drawing it outward through one of the access openings 44.

I claim:

1. A trash intercepting clean-out coupling adapted to be installed between the vertically-spaced end portions of upper and lower downspout sections, said coupling comprising
   — an upper inlet duct adapted to be fitted onto the lower end portion of the upper downspout section,
   — a trash intercepting clean-out housing disposed below said inlet duct and having a wall structure defining a trash collection chamber,
   — a lower outlet duct disposed below said trash intercepting clean-out housing and adapted to be fitted onto the upper end portion of the lower downspout section,
   — and a screen disposed between said trash collection chamber and said outlet duct,
   — said wall structure having an inlet opening communicating with said inlet duct and an outlet opening communicating with said outlet duct and a pair of trash removal access openings communicating with said chamber and disposed on opposite sides of said outlet duct in laterally-spaced relationship thereto.

2. A trash intercepting clean-out coupling, according to claim 1, wherein said wall structure is horizontally elongated with horizontally-spaced opposite ends, and wherein said trash removal access openings are disposed at said opposite ends of said wall structure.

* * * * *